United States Patent
Stanek et al.

(10) Patent No.: US 9,537,124 B2
(45) Date of Patent: Jan. 3, 2017

(54) VARIABLE INSULATING BATTERY PACK SYSTEM AND METHOD

(75) Inventors: Joe Stanek, Northville, MI (US); Chris Adam Ochocinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 809 days.

(21) Appl. No.: 13/069,656

(22) Filed: Mar. 23, 2011

(65) Prior Publication Data

US 2012/0244393 A1    Sep. 27, 2012

(51) Int. Cl.
| | |
|---|---|
| *H01M 10/6561* | (2014.01) |
| *H01M 2/10* | (2006.01) |
| *H01M 10/625* | (2014.01) |
| *H01M 10/615* | (2014.01) |
| *H01M 10/655* | (2014.01) |
| *H01M 10/613* | (2014.01) |
| *H01M 10/658* | (2014.01) |

(52) U.S. Cl.
CPC ......... *H01M 2/1077* (2013.01); *H01M 10/613* (2015.04); *H01M 10/615* (2015.04); *H01M 10/625* (2015.04); *H01M 10/655* (2015.04); *H01M 10/6561* (2015.04); *H01M 10/658* (2015.04); *H01M 2220/20* (2013.01)

(58) Field of Classification Search
CPC .............. H01M 10/50; H01M 10/5002; H01M 10/655; H01M 10/6561; H01M 10/658
USPC ......................................................... 429/120
See application file for complete search history.

(56) References Cited

U.S. PATENT DOCUMENTS

| | | | |
|---|---|---|---|
| 7,501,793 B2 | 3/2009 | Kadouchi et al. | |
| 2005/0084754 A1* | 4/2005 | Klein | 429/210 |
| 2005/0089750 A1* | 4/2005 | Ng et al. | 429/120 |
| 2009/0023056 A1 | 1/2009 | Adams et al. | |
| 2011/0159352 A1* | 6/2011 | Culver et al. | 429/160 |

FOREIGN PATENT DOCUMENTS

JP    2006139928 A  *  6/2006

OTHER PUBLICATIONS

Machine Translation of JP 2006-139928 originally published to Hirose et al. in Jun. 2006.*

* cited by examiner

*Primary Examiner* — Jonathan G Leong
(74) *Attorney, Agent, or Firm* — David Kelley, Esq.; Tung & Associates

(57) ABSTRACT

A variable insulating battery pack system includes a battery pack enclosure sized and configured to contain the battery pack, an enclosure space in the battery pack enclosure and a fluid pump disposed in fluid communication with the enclosure space and adapted to evacuate and pressurize the enclosure space.

20 Claims, 2 Drawing Sheets

VARIABLE INSULATING BATTERY PACK SYSTEM AND METHOD

FIELD

The disclosure generally relates to batteries for hybrid and electric vehicles. More particularly, the disclosure relates to a variable insulating battery pack system and method which controls the temperature of a battery pack for optimum performance in a hybrid or electric vehicle or other application.

BACKGROUND

In operation of hybrid and battery-powered electric vehicles, a challenge is to maintain a battery temperature which is suitable for optimum high-voltage battery performance. Battery chemistry composition may lead to reduced battery performance during operating temperature extremes and may require battery cooling and heating maintenance for optimum battery operation. During different phases of vehicle operation, the high-voltage vehicle battery may require charging and discharging which may generate heat that must be dissipated. However, in some operating environments, the battery may require active heating or cooling to maintain a specific battery temperature. Battery heating and cooling may require an input of energy from onboard or other sources, reducing fuel economy. Moreover, battery temperature extremes may severely limit battery power and energy capabilities.

Accordingly, a variable insulating battery pack system and method which controls the temperature of a battery pack for optimum performance in a hybrid or electric vehicle or other application is needed.

SUMMARY

The disclosure is generally directed to a variable insulating battery pack system for controlling the temperature of a battery pack. An illustrative embodiment of the system includes a battery pack enclosure sized and configured to contain the battery pack, an enclosure space in the battery pack enclosure and a fluid pump disposed in fluid communication with the enclosure space and adapted to evacuate and pressurize the enclosure space.

The disclosure is further generally directed to a variable insulating battery pack system. An illustrative embodiment of the system includes a space with a fixed volume created around a battery pack, a vacuum selectively induced in the space to insulate the battery pack and pressurization selectively induced in the space to facilitate thermal transfer from the battery pack.

The disclosure is further generally directed to a variable insulating battery pack method. An illustrative embodiment of the method includes creating a space with a variable volume around a battery pack, facilitating thermal transfer of heat from the battery pack by inducing a vacuum in the space and shrinking the space and insulating the battery pack by pressurizing and expanding the space.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to implement the disclosure and are not intended to limit the scope of the claims. Furthermore, there is no intention to be bound by any expressed or implied theory presented in the preceding technical field, background, brief summary or the following detailed description.

Figure 1:
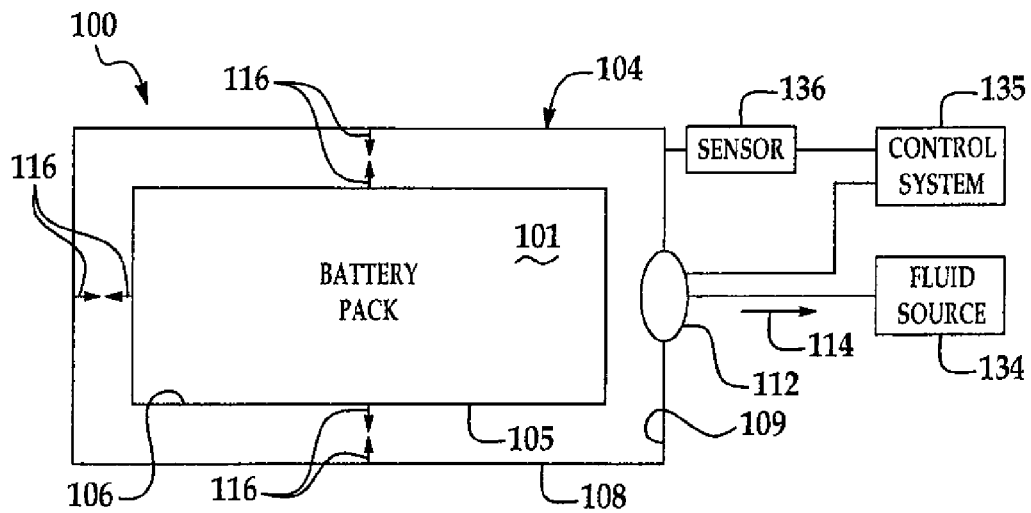
FIG. 1 is a diagram which illustrates an illustrative embodiment of the variable insulating battery pack system, more particularly illustrating operation of the system in a battery-insulating configuration.
Figure 2:
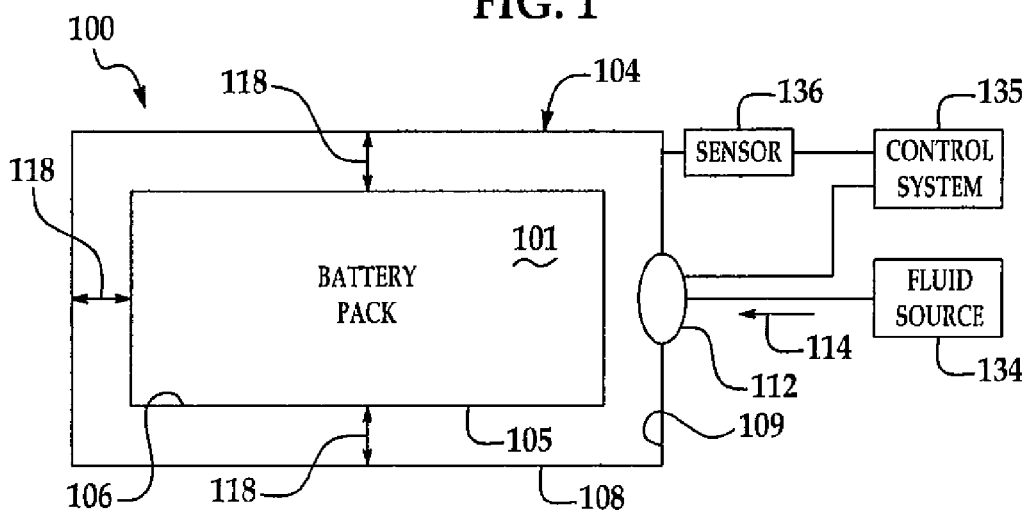
FIG. 2 is a diagram which illustrates an illustrative embodiment of the variable insulating battery pack system, more particularly illustrating operation of the system in an optimal thermal transfer configuration.

Referring initially to FIGS. 1 and 2, an illustrative embodiment of the variable insulating battery pack system, hereinafter system, is generally indicated by reference numeral 100. In some embodiments, the system 100 may include a battery pack enclosure 104 having an enclosure interior 106 which is sized and configured to contain a battery pack 101. In some applications, the battery pack 101 may be a high-voltage battery pack which is to be used to store electrical power in a Hybrid Electric Vehicle (HEV) or a battery-powered electric vehicle. In other applications, the battery pack 101 may be used in other vehicle or non-vehicle applications.

The battery pack enclosure 104 may include an inner enclosure wall 105 which encloses the enclosure interior 106. An outer enclosure wall 108 may substantially enclose the inner enclosure wall 105. An enclosure space 109 of substantially fixed volume may be defined between the inner enclosure wall 105 and the outer enclosure wall 108. Each of the inner enclosure wall 105 and the outer enclosure wall 108 may be plastic, metal or other substantially rigid material.

A bidirectional fluid pump 112 may be disposed in fluid communication with the enclosure space 109. A fluid source 134 may be disposed in fluid communication with the fluid pump 112. The fluid source 134 may be adapted to contain a supply of pressurizing fluid 114. In some embodiments, the pressurizing fluid 114 may include air or other gas. A control system 135 may interface with the fluid pump 112. A fluid pressure sensor 136 may interface with the control system 135. The fluid pressure sensor 136 may be disposed in fluid communication with the enclosure space 109. Accordingly, responsive to operation of the control system 135 via input from the fluid pressure sensor 136, the fluid pump 112 may be adapted to selectively pump the pressurizing fluid 114 from the fluid source 134 into the enclosure space 109, as shown in FIG. 2, to induce a positive pressure 118 in the enclosure space 109. The positive pressure 118 in the enclosure space 109 may facilitate thermal transfer of heat from the battery pack 101 to the environment of the battery pack enclosure 104. Alternatively, the fluid pump 112 may selectively pump the pressurizing fluid 114 from the shell space 109 into the fluid source 134, as shown in FIG. 1, to induce a negative vacuum pressure 116 in the shell space 109. The negative vacuum pressure 116 in the shell space 109 may facilitate insulation of the battery pack 101 from temperatures in the environment of the battery pack enclosure 104.

In exemplary operation of the system 100, the control system 135 with supporting software optimizes strategies which provide the best projected thermal battery operation by predicting battery and vehicle operation conditions and controlling the thermal conditions of the battery pack 101 accordingly. Responsive to input from the fluid pressure sensor 136, the control system 135 operates the fluid pump 112 in such a manner that the negative vacuum pressure 116 (FIG. 1) is generated in the enclosure space 109 under conditions in which thermal insulation of the battery pack 101 would optimize performance of the battery pack 101. Alternatively, responsive to input from the fluid pressure sensor 136, the control system 135 operates the fluid pump 112 in such a manner that the positive pressure 118 (FIG. 2) is generated in the enclosure space 109 under conditions in which thermal transfer of heat from the battery pack 101 would optimize performance of the battery pack 101.

Figure 3:
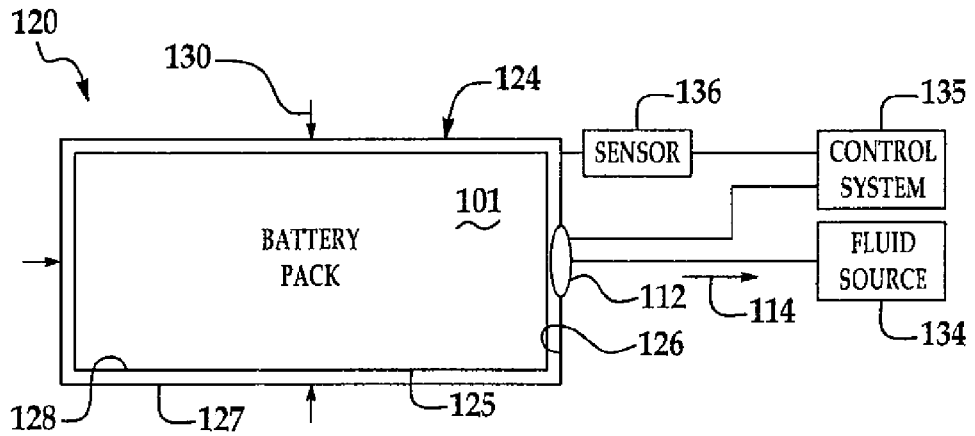
FIG. 3 is a diagram which illustrates an alternative illustrative embodiment of the variable insulating battery pack system, more particularly illustrating operation of the system in an optimal thermal transfer configuration.
Figure 4:
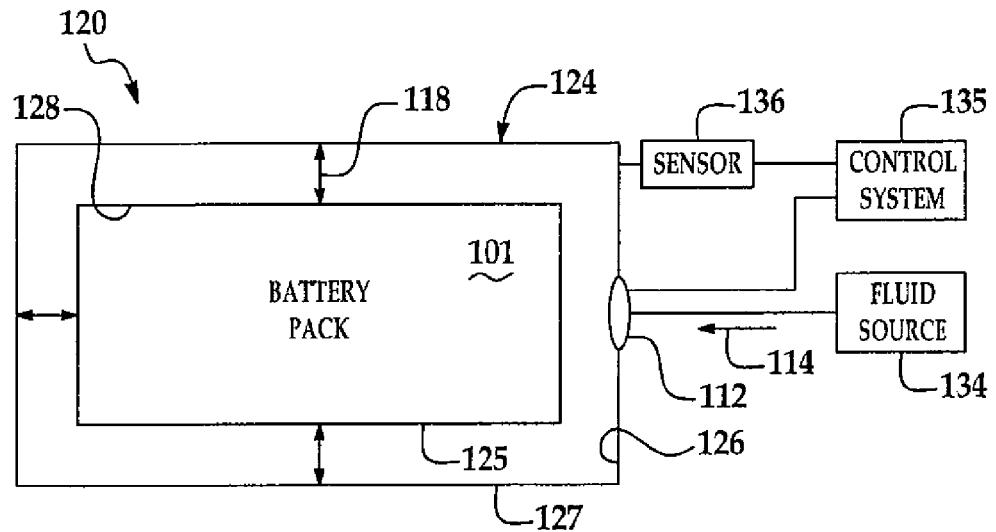
FIG. 4 is a diagram which illustrates the alternative illustrative embodiment of the variable insulating battery pack system illustrated in FIG. 3, more particularly illustrating operation of the system in a battery-insulating configuration.

Referring next to FIGS. 3 and 4, an alternative illustrative embodiment of the variable insulation battery pack system is generally indicated by reference numeral 120. In some embodiments, the system 120 may include a battery pack enclosure 124 having an enclosure interior 128 which is sized and configured to contain a battery pack 101.

The battery pack enclosure 124 may include an inner enclosure wall 125 which encloses the enclosure interior 128. An outer enclosure wall 127 may substantially enclose the inner enclosure wall 125. Each of the inner enclosure wall 125 and the outer enclosure wall 127 may be rubber or other flexible, expandable and retractable material. An enclosure space 126 of variable volume may be defined between the inner enclosure wall 125 and the outer enclosure wall 127.

A bidirectional fluid pump 112 may be disposed in fluid communication with the enclosure space 126. A fluid source 134 which contains a supply of pressurizing fluid 114 may be disposed in fluid communication with the fluid pump 112. A control system 135 may interface with the fluid pump 112. A fluid pressure sensor 136 may interface with the control system 135. The fluid pressure sensor 136 may be disposed in fluid communication with the enclosure space 126. Accordingly, responsive to operation of the control system 135 via input from the fluid pressure sensor 136, the fluid pump 112 may be adapted to selectively pump the pressurizing fluid 114 from the fluid source 134 into the enclosure space 126, as shown in FIG. 4, to induce a positive pressure 118 in the enclosure space 126. The positive pressure 118 may push the outer enclosure wall 127 outwardly from the inner enclosure wall 125, expanding the volume of the enclosure space 126 and thermally insulating the battery pack 101 from the environment of the battery pack enclosure 124. Alternatively, the fluid pump 112 may selectively pump the pressurizing fluid 114 from the enclosure space 126 into the fluid source 134, as shown in FIG. 3, to induce a negative vacuum pressure (not shown) in the enclosure space 126. The negative vacuum pressure in the enclosure space 126 may draw the outer enclosure wall 127 inwardly toward the inner enclosure wall 125 and reduce the volume of the enclosure space 126 under the influence of atmospheric pressure 130. The reduction in volume of the enclosure space 126 may facilitate thermal transfer of heat from the battery pack 101 to the environment of the battery pack enclosure 124.

In exemplary operation of the system 120, the control system 135 with supporting software optimizes strategies which provide the best projected thermal battery operation by predicting battery and vehicle operation conditions and controlling the thermal conditions of the battery pack 101 accordingly. Responsive to input from the fluid pressure sensor 136, the control system 135 operates the fluid pump 112 in such a manner that the negative vacuum pressure (not illustrated) is generated in the enclosure space 126, as shown in FIG. 3, under conditions in which thermal transfer of heat from the battery pack 101 would optimize performance of the battery pack 101. Alternatively, responsive to input from the fluid pressure sensor 136, the control system 135 operates the fluid pump 112 in such a manner that the positive pressure 118 (FIG. 4) is generated in the enclosure space 126 under conditions in which thermal insulation of the battery pack 101 would optimize performance of the battery pack 101.

Figure 5:
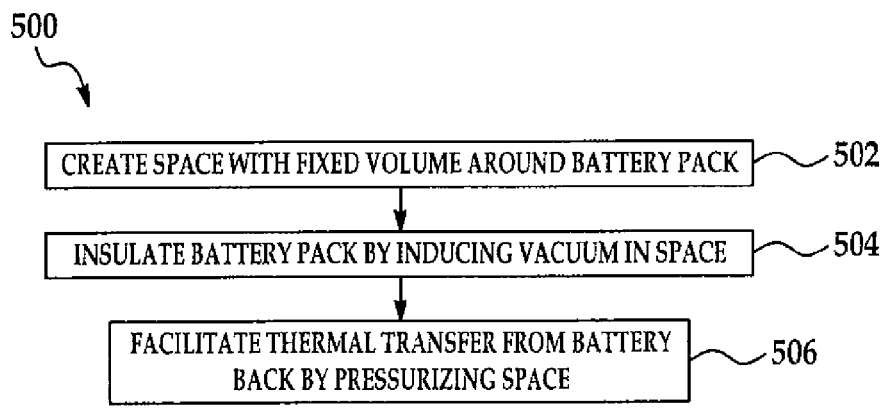
FIG. 5 is a flow diagram of an illustrative embodiment of a variable insulating battery pack method.

Referring next to FIG. 5, a flow diagram 500 of an illustrative embodiment of a variable insulating battery pack method is shown. In block 502, a space with a substantially fixed volume is created around a battery pack. In block 504, the battery pack is thermally insulated by inducing vacuum pressure in the space. The vacuum pressure may be induced in the space by pumping a pressurizing fluid from the space. In block 506, thermal transfer of heat from the battery pack is facilitated by pressurizing the space. Pressurization of the space may be accomplished by pumping a pressurized fluid into the space.

Figure 6:
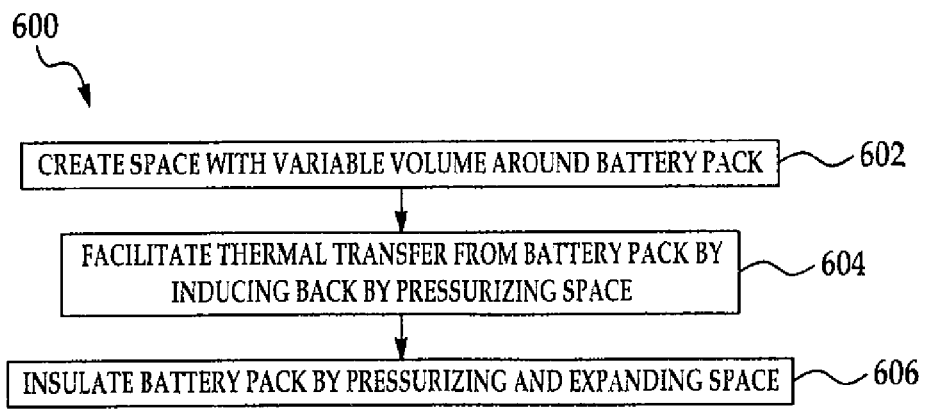
FIG. 6 is a flow diagram of an alternative illustrative embodiment of a variable insulating battery pack method.

Referring next to FIG. 6, a flow diagram 600 of an illustrative embodiment of a variable insulating battery pack method is shown. In block 602, a space with a variable volume is created around a battery pack. In block 604, thermal transfer of heat from the battery pack is facilitated by inducing vacuum pressure in the space and reducing the volume of the space. The vacuum pressure may be induced in the space by pumping a pressurizing fluid from the space. In block 606, thermal insulation of the battery pack is facilitated by pressurizing and expanding the volume of the space. Pressurization of the space may be accomplished by pumping a pressurized fluid into the space.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A variable insulating battery pack system configured to control the temperature of a battery pack, comprising:
   a battery pack enclosure sized and configured to contain and surround the battery pack;
   said battery pack enclosure comprising a flexible enclosure space, said enclosure space enclosing said battery pack, said battery pack enclosure comprising a flexible outer enclosure wall defining said enclosure space, substantially an entire portion of said outer enclosure wall is flexible and configured to move inwardly and outwardly with respect to said battery pack on all sides of said battery pack; and a fluid pump disposed in fluid communication with the enclosure space and configured to evacuate and pressurize the enclosure space.

2. The system of claim 1 wherein the enclosure space comprises a variable volume.

3. The system of claim 1 wherein the battery pack enclosure further comprises an inner enclosure wall wherein the outer enclosure wall is spaced-apart from the inner enclosure wall.

4. The system of claim 3 wherein at least the outer enclosure wall comprises a generally flexible and retractable material.

5. The system of claim 1 further comprising a fluid source disposed in fluid communication with the fluid pump.

6. The system of claim 5 further comprising a fluid pressure sensor disposed in fluid communication with the enclosure space and a control system interfacing with the fluid pump and the fluid pressure sensor.

7. A variable insulating battery pack method, comprising:
creating a flexible space with a variable volume surrounding a battery pack, said flexible space comprising a battery pack enclosure containing and enclosing the battery pack, said battery pack enclosure comprising a flexible outer enclosure wall defining said flexible space, substantially an entire portion of said outer enclosure wall is flexible and configured to move inwardly and outwardly with respect to said battery pack on all sides of said battery pack;

facilitating thermal transfer of heat from the battery pack by inducing a vacuum in the space and shrinking the space; and insulating the battery pack by pressurizing and expanding the space, said inducing a vacuum and pressurizing a space comprising respectively pumping a pressurizing fluid out of and into said space.

8. The method of claim 7 wherein pumping a pressurized fluid from the space comprises pumping air from the space.

9. The method of claim 7 wherein pressurizing and expanding the space comprises pumping a pressurized fluid into the space.

10. The method of claim 9 wherein pumping a pressurized fluid into the space comprises pumping air into the space.

11. The method of claim 7 further comprising measuring pressure in the space and implementing one of inducing a vacuum in the space and pressurizing the space based on the measured pressure in the space.

12. The system of claim 3 wherein each of the inner enclosure wall and the outer enclosure wall comprises a generally flexible and retractable material.

13. The system of claim 1, said flexible enclosure space configured to respectively shrink and expand in response to said evacuation and said pressurization.

14. The system of claim 6 wherein the control system is configured to control said pump to cause an increase or decrease of a pressure of the flexible enclosure space in response to input from the pressure sensor.

15. The system of claim 14 wherein the control system is configured to control the pressure of the enclosure space in response to input from the pressure sensor and input comprising battery and vehicle operation conditions predicted by the control system.

16. A variable insulating battery pack system configured to control the temperature of a battery pack, comprising:
a battery pack enclosure sized and configured to contain the battery pack;

the battery pack enclosure comprising a flexible enclosure space, the flexible enclosure space enclosing the battery pack, the flexible enclosure space configured to change volume in response to a pressure change in the flexible enclosure space, the battery pack enclosure comprising a flexible outer enclosure wall defining the flexible enclosure space, substantially an entire portion of the outer enclosure wall is flexible and configured to move inwardly and outwardly with respect to the battery pack on all sides of the battery pack; and a fluid pump disposed in fluid communication with the enclosure space, the fluid pump configured to evacuate and pressurize the enclosure space.

17. The system of claim 16 further comprising a fluid pressure sensor disposed in fluid communication with the flexible enclosure space and a control system interfacing with the fluid pump and the fluid pressure sensor.

18. The system of claim 16 wherein the battery pack further comprises an inner enclosure wall, wherein at least the outer enclosure wall comprises a generally flexible and retractable material.

19. The system of claim 17 wherein the control system is configured to control the pressure of the enclosure space in response to input from the pressure sensor.

20. The system of claim 19 wherein the control system is configured to control the pressure of the enclosure space in response to input comprising battery and vehicle operation conditions predicted by the control system.

* * * * *